G. McD. JOHNS.
MOTOR STARTING RHEOSTAT.
APPLICATION FILED OCT. 25, 1909.
1,117,191.
Patented Nov. 17, 1914.
3 SHEETS—SHEET 1.
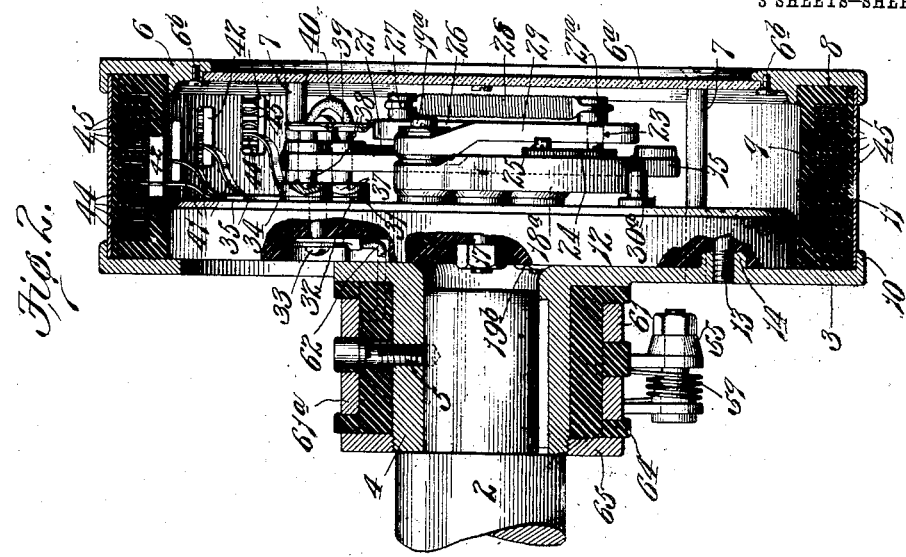
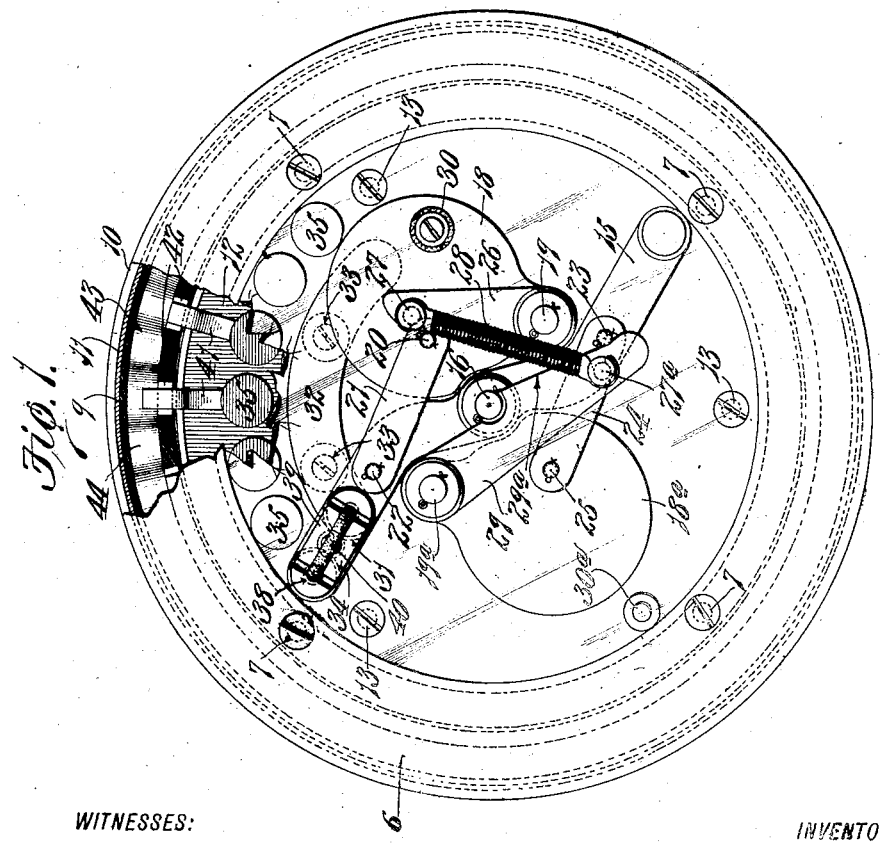
WITNESSES:
INVENTOR:
George McD. Johns.
BY
Ralph Kalish
ATTORNEY.

G. McD. JOHNS.
MOTOR STARTING RHEOSTAT.
APPLICATION FILED OCT. 25, 1909.
1,117,191.
Patented Nov. 17, 1914.
3 SHEETS—SHEET 2.
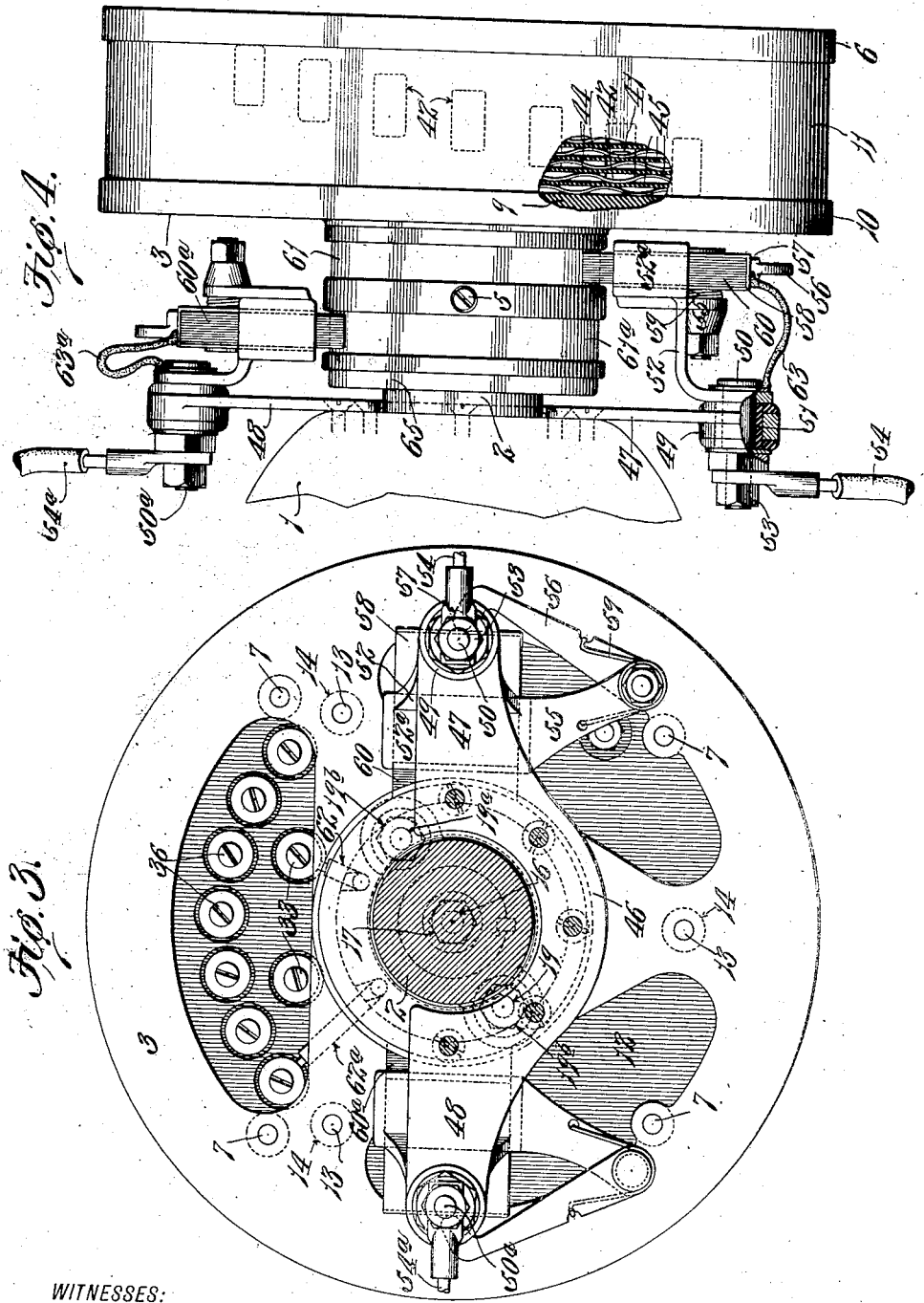
WITNESSES:
INVENTOR
George McD. Johns
BY
ATTORNEY

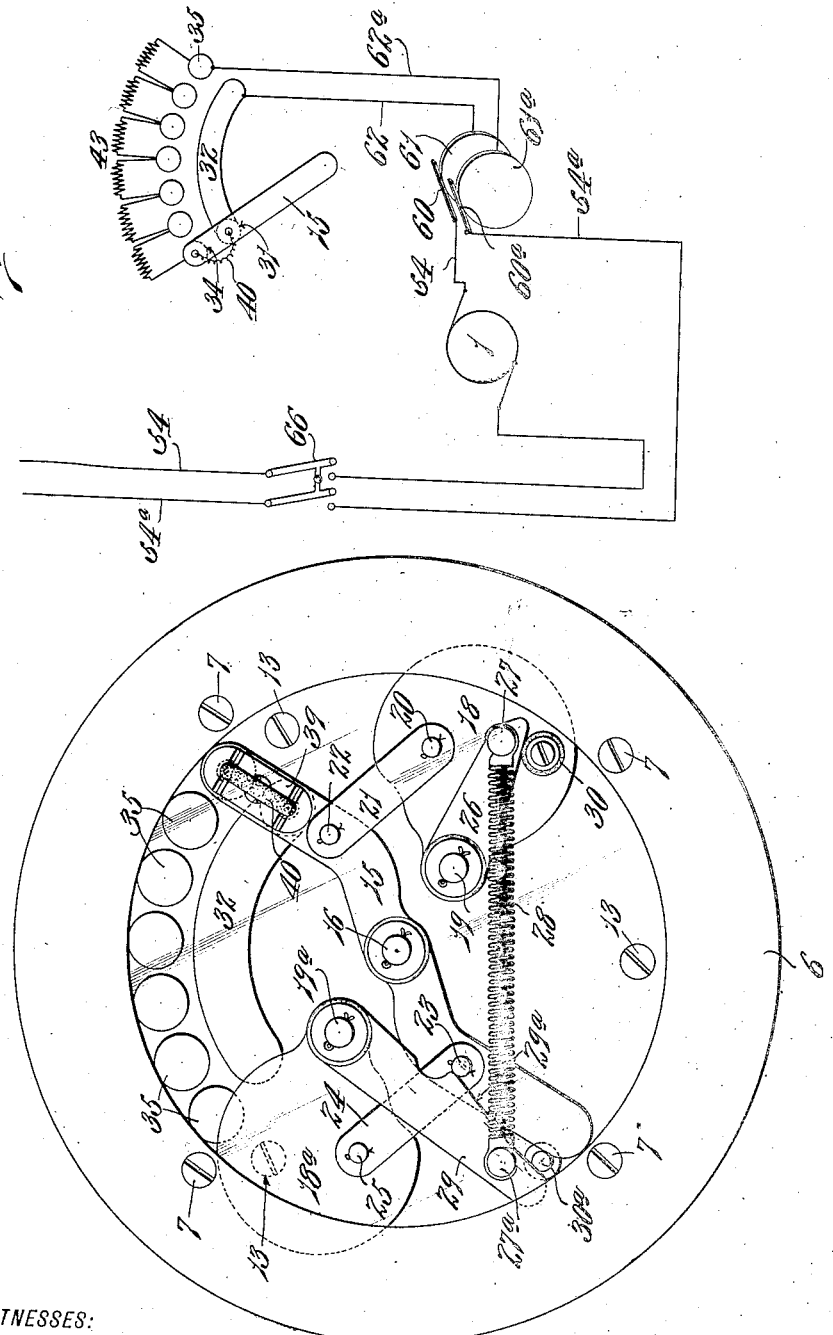

UNITED STATES PATENT OFFICE.

GEORGE McD. JOHNS, OF ST. LOUIS, MISSOURI.

MOTOR-STARTING RHEOSTAT.

1,117,191. Specification of Letters Patent. Patented Nov. 17, 1914.

Application filed October 25, 1909. Serial No. 524,559.

*To all whom it may concern:*

Be it known that I, GEORGE McD. JOHNS, a citizen of the United States, residing at the city of St. Louis, State of Missouri, have invented a new and useful Improvement in Motor-Starting Rheostats, of which the following is a specification, reference being had to the accompanying drawings, forming a part hereof, in which—

Figure 1 is a front elevational view, partly broken away, showing my rheostat in closed position with the resistance units cut in, as when the motor is starting; Fig. 2 is a vertical sectional view, partly in elevation; Fig. 3 is a rear elevational view; Fig. 4 is a top plan view, partly broken away, showing my rheostat in operative position on an armature shaft; Fig. 5 is a view similar to Fig. 1, showing the rheostat in open position with the resistance units cut out, as when the motor is running at full speed; Fig. 6 is a diagrammatic view illustrating the system of wiring through my rheostat and its associate parts.

This invention relates to new and useful improvements in devices, commonly called starting rheostats, motor starters, or starting boxes, adapted to regulate the resistance in a motor circuit during the period of starting and speeding-up of the motor.

As is well known, the resistance of a motor circuit through practically every type of motor is comparatively small, and it is necessary, therefore, when starting the motor to insert or cut-in resistance in series with the motor circuit, for otherwise the rush of current would tend to burn out and disrupt the motor. As the armature of the motor revolves, however, a counter resistance or electromotive force is generated by the motor, which protects the motor circuit, this counter resistance or electromotive force increasing or diminishing according to the speed of the motor. And accordingly, while, as stated, it is necessary, in order to protect the motor circuit, to cut in resistance on starting the motor, means must be provided to cut out this resistance as the motor speeds up and a counter resistance or electromotive force is generated thereby, and to again cut in this resistance when the motor has stopped or dropped to such a speed that the counter electromotive force generated thereby at this reduced speed would not be sufficient to protect the motor circuit in case of full current being supplied thereto. Further, as this resistance is not usually designed or adapted to carry the current continuously, but only for a short period of time, either care must be taken or means provided to not only gradually and progressively cut out this resistance according to the speed of the motor and the counter electromotive force generated thereby, but also sufficiently quickly to prevent this resistance from becoming overheated or being burnt out.

The objects of my invention are, therefore, to provide, in connection with a resistance for motor circuits, means whereby this resistance may be automatically and gradually cut out as the motor speeds up and a corresponding counter electromotive force is generated thereby, and this resistance again automatically cut in when the motor has either stopped or dropped to such a speed that the counter electromotive force generated thereby at such reduced speed would not be sufficient to protect the motor circuit in the event a full current was supplied thereto and to improve generally upon devices of the kind stated.

With these objects in view, my invention resides in the provision in a motor-starting rheostat having a series of resistance units adapted to be in series with a motor circuit when the motor is at a standstill, of means adapted to be in series with said series of resistance units when the motor is at a standstill and to be, directly or indirectly, centrifugally actuated as the motor speeds up and generates an increasing counter electromotive force to progressively cut units of resistance out of series with said circuit; of means adapted to coöperate with said cutting-out means as the motor speeds up to progressively resistingly balance, throughout the travel of said cutting-out means, the increasing centrifugal force exerted to actuate said cutting-out means, whereby the movement of said cutting-out means is directly proportional to the increasing speed of the motor and said units of resistance are gradually cut out of series with said circuit according or directly proportional to motor requirements as the speed of the motor increases; and of means adapted to coöperate with said cutting-out means, after such cutting-out means has been so centrifugally actuated or moved to full cutting-out position, to reversely actuate said cutting-out means to cut said units of resistance into series with said circuit on a predetermined decrease in the speed of the motor, said cutting-out means being centrifugally maintained in full cutting-out position until so reversely actuated; in the novel features of construction of my rheostat; and in the novel arrangement and combination of the several parts thereof, all as will hereinafter be described and afterward pointed out in the claims.

Referring to the drawings, 1 indicates a motor and 2 the armature shaft thereof.

3 indicates a back-plate, preferably of metal, provided with a preferably integral hub portion 4 adapted to be mounted upon armature shaft 2. This hub portion 4 is preferably keyed to said armature shaft 2, as shown in Fig. 2, and is also preferably fastened thereon by a securing screw 5, the back-plate 3 and the parts mounted thereon hereinafter described being adapted to rotate or revolve with said armature shaft.

6 indicates a preferably metallic ring adapted to be suitably spaced from, and secured to, said back-plate 3 by a plurality of screws or bolts 7, the space between said ring 6 and back-plate 3 providing a housing for the parts hereinafter mentioned, 6$^a$ indicating a front or face cover-plate of glass or other suitable material suitably secured, as by small screws 6$^b$, within said ring 6. This ring 6 on its inner side is channel-shaped, as at 8, in which is adapted to fit one side of an insulation drum 9, the opposite side of said insulation drum preferably bearing against, and being supported on an annular flange 10 on said back-plate 3. And interposed between said back-plate 3 and ring 6 and completely surrounding or encircling the outer surface of said drum 9, is a preferably metallic circular cover-plate 11.

12 indicates a preferably circular plate or slate or other insulation material arranged within said housing and secured to said back-plate 3 by a plurality of screws 13, these screws 13 preferably being threaded into bosses 14 on said back-plate, whereby a firm bearing for said plate 12 is provided.

15 indicates a lever pivotally mounted midway between its ends on a pivot bolt 16 arranged on and extending through said insulation plate 12 at approximately the center thereof and having on its inner end a securing-nut 17 preferably embedded or counter-sunk in plate 12, the shape of said lever being substantially and preferably that of a compound curve, see particularly Figs. 1 and 5.

18 and 18$^a$ indicate like or similar weights, which are, respectively, mounted on pivot bolts 19 and 19$^a$ extending through and being supported in said insulation plate 12 on opposite sides of said lever 15 and equidistant from said pivot bolt 16, each of said pivot bolts 19 and 19$^a$ having on its inner end a securing nut 19$^b$ preferably embedded or countersunk in said plate 12, see particularly Fig. 3. 20 indicates a stud mounted on said weight 18, on which stud is pivotally mounted or arranged one end of a link 21, the other end of said link being pivotally connected, as at 22, to said lever 15 to one side of said pivot bolt 16. Arranged on the opposite end of said lever 15 and equidistant from said pivot bolt 16 with said pivot point 22, is a stud 23, on which stud 23 is pivotally arranged one end of a link 24, the other end of said link being pivotally connected to said weight 18$^a$, as at 25, this pivot point 25 and said stud 20 being equidistant from said pivot bolt 16, whereby, on the rotation of said armature shaft 2, the weights 18 and 18$^a$ will be centrifugally thrown or swung outwardly on their pivot bolts 19 and 19$^a$, and thereby pivotally move said lever 15 on its pivot bolt 16.

Pivotally mounted on bolt 19 is an arm 26 provided on its outer end with a preferably grooved stud 27, on which stud 27 is secured one end of a coiled spring 28, the opposite end of said coiled spring being secured to a similarly grooved stud 27$^a$ mounted on the outer end of an arm 29, the opposite end of said arm 29 being pivotally mounted on said pivot bolt 19$^a$. The outer end of said arm 29, and on the inner side thereof, is preferably provided with a cam surface 29$^a$, with which cam surface 29$^a$ said stud 23 is adapted to coöperate, the said coiled spring 28 being adapted to hold said stud 23 and cam surface 29$^a$ in operative engagement, and said stud 23 being adapted to ride up said cam surface when said weights 18 and 18$^a$ are swung or thrown outwardly on the rotation of said armature shaft 2, whereby the leverage of arm 29 relative to said stud 23 is varied or changed and the pull of said spring 28 through said arm 29 on said stud 23 is increased.

30 indicates a buffer, preferably of rubber or other suitable material, arranged on said weight 18, see particularly Figs. 1 and 5, and against which buffer the outer end of said arm 26 is adapted to contact and bear when said weights 18 and 18$^a$ have been swung or thrown to their outermost position; and 30$^a$ indicates a stop arranged on plate 12 and adapted to limit the pivotal movement or travel of said lever 15. Near the outer end of one, which, for convenience, I will call the upper, portion of said lever 15, see particularly Figs. 1, 2 and 5, is arranged an inwardly projecting contact-button 31 adapted to contact with an arc-shaped metallic strip 32 secured to said insulation plate 12 by means of screws 33 or the like. At the outer end of the said upper portion of said lever 15 and spaced a short distance from said button 31, is a similar contact-button 34 adapted to contact with a series of contact-buttons 35 concentrically arranged on and secured by screws 36 or the like to said insulation plate 12. Each of said buttons 31 and 34 is provided on its upper surface with a cone-shaped recess 37, in each of which recesses is adapted to be seated one end of a small metallic rod 38. Each of the rods 38 is slidably mounted in said lever 15 and upon the outer ends thereof bears a leaf-spring 39, said spring 39 being secured to said lever 15 at a point intermediate said rods 38. Said rods 38 are also electrically connected by means of a short conducting wire 40, for purposes hereinafter appearing. Each of the said contact-buttons 35 is provided with an outwardly-extending contact strip 41 of suitable conducting material, each of said strips 41 being adapted to project or extend into like slots or openings 42 provided at suitable intervals on the inner rim of said drum 9 to contact with a series of continuously wound resistance units 43 in said drum. While the winding of these resistance units may be of any approved form now employed in starting boxes or starting rheostats, yet I prefer to use in my rheostat for this winding, as herein shown, a continuous ribbon or tape 44 of suitable resistance material, this ribbon or tape being suitably crimped and spirally wound around said drum, the several windings being separated by suitable insulation material 45.

Secured to the motor 1 and embracing the armature shaft 2, as shown in Fig. 3, is a preferably horizontally-disposed supporting bracket 46 having laterally projecting arms 47 and 48, on which arms are adapted to be arranged the brushes now to be described; and as these brushes are similar in construction, a full description of the brush arranged on arm 47 will only be here given. On the outer end of arm 47 is a hollow bearing 49, in which bearing is mounted a bolt 50 insulated from said bearing by insulation material 51. Mounted on the outer end of said bolt 50 is a bracket 52 having a hollow head portion 52ª, and connected to the inner end of said bolt 50, and secured thereon by a suitable securing nut 53, is one end of line wire 54. The bracket 52 is also provided with a depending arm or extension 55, on the end of which is pivotally mounted an arm 56 having a preferably enlarged head 57 adapted to contact with and bear against a U-shaped metallic casing 58 slidably arranged in said head portion 52ª of bracket 52, said arm 56 being held in yielding engagement with said casing 58 by means of a suitable spring 59, see particularly Fig. 3. In said casing 58 is arranged preferably a carbon brush 60, which is adapted to bear against and contact with a metallic ring 61 of suitable conducting material arranged on and around the hub 4 of back-plate 3, ring 61 being suitably electrically connected by a short wire 62 to said strip 32, while said bracket 52, which is in metallic contact with said bolt 50, is connected by a short conducting wire 63 to said casing 58, as shown particularly in Fig. 4. The brush 60ª, which, as before stated, is similar in construction to said brush 60 and similarly mounted, bears against and contacts with a metallic ring 61ª similar to ring 61 and likewise arranged on and around said hub portion 4 of back-plate 3. This ring 61ª is, however, suitably electrically connected by a short conducting wire 62ª with, referring to Fig. 1, the right-hand button 35, while a short conducting wire 63ª electrically connects said brush 60ª with bolt 50ª mounted on said arm 48, said bolt 50ª having secured thereon one end of the other line wire 54ª. The said metallic rings 61 and 61ª are suitably insulated from said hub portion 4 by suitable insulation material 64, a ring 65 being adapted to be screwed onto said hub 4 to securely hold said rings 61 and 61ª and said insulation material 64 in proper position on said hub 4, see particularly Fig. 2.

With reference particularly to Figs. 4 and 6, it will be seen that line wire 54 leads from a source of electrical energy supply through a circuit breaker 66 adapted to open in case of overload or excessive current, through motor 1, to bolt 50, and that line wire 54ª leads from bolt 50ª through said circuit breaker 66 back to said source of supply, and that the circuit is completed, when the lever 15 is in the position shown in Figs. 1 and 6, from bolt 50, through wire 63, casing 58, brush 60, ring 61, and wire 62, to strip 32, then through strip 32, button 31, wire 40, button 34, left-hand button 35, contact-strip 41 on said left-hand button 35, entire series of resistance units 43, wire 62ª, ring 61ª, brush 60ª, and wire 63ª, to bolt 50ª. And when the said lever 15 is in said position, the weights 18 and 18ª are in what might be called closed position, as when the motor is at a standstill and is generating no counter electromotive force, the entire series of resistance units 43 being in series with the motor circuit and the button 34 contacting with the left-hand button 35; and it will be seen, referring particularly to Fig. 1, that said spring-connected arms 26 and 29 are adapted to engage through studs 20 and 23 with said weights 18 and 18ª and lever 15 to hold said weights and lever in such closed or, as it might be said, normal position. When the armature revolves, the weights 18 and 18ª will, however, be centrifugally thrown outwardly against the tension of said spring 28 or the pull of said arms, thereby pivotally moving the lever 15 on its pivot bolt 16; and as said lever 15 pivotally moves to the right and as said contact-button 34 moves therewith also to the right and contacts in turn with each succeeding button 35 to the right of the left-hand button 35, the preceding unit of resistance 43 to the left of the button 35 with which said button 34 is then in contact is cut out, the motor generating a constantly increasing counter electromotive force which protects the motor circuit in place of the resistance which is being cut out, and as each unit of resistance is in turn cut out, the speed of the motor, due to the increased current thereby allowed to the motor, increases and the centrifugal force tending to throw said weights outwardly becomes correspondingly greater, until finally the motor is running at normal full speed and said weights 18 and 18ª have been thrown to outermost position and the lever 15 has reached the limit of its travel to the right, as shown in Fig. 5, when the button 34 will then contact with the right-hand button 35 and the entire series of resistance units 43 has been cut out, the circuit being then completed directly to and through said right-hand button 35 to and through wire 62ª and then as before described. Now, not only do said spring-connected arms 26 and 29 engage, as stated, with said weights 18 and 18ª and lever 15 to hold the same in closed or normal position, as when the motor is at a standstill and generating no counter electromotive force, but said arms 26 and 29 further coöperate with said weights 18 and 18ª and lever 15 as the motor speeds up to proportionally increase the pull of said spring 28 against lever 15 to progressively resistingly balance the increasing centrifugal force exerted by said weights to pivotally move the same, whereby the pivotal movement of lever 15 is directly proportional to the increasing speed of the motor, so that at any point throughout the travel of said lever 15 during acceleration of speed of shaft 2, there shall be in series with the motor only a predetermined amount of resistance, according to motor requirements.

As the centrifugal force developed on rotation of armature shaft 2, increases directly as the square of the velocity of rotation of said shaft, were the spring 28 connected or attached at its ends directly to the weights 18 and 18ª or to the studs 20 and 23, the increasing centrifugal force developed as the motor speeds up would greatly over-balance the pull or tension of the spring 28 on lever 15: in other words, the increasing centrifugal force exerted by the weights 18 and 18ª tending to pivotally move lever 15 during the acceleration of speed of shaft 2 and the retarding pull or tension of spring 28 on lever 15 for the same distance of travel of said lever 15 would be different or unequal, and consequently the said lever 15 would travel outwardly or to the right too quickly, thereby improperly cutting out the resistance required to protect the motor circuit according to the counter electromotive force generated by the motor or according to motor requirements when the motor is running at a certain speed below rated full speed. To balance these forces, that is the retarding or resisting pull or tension of spring 28 on lever 15 and the increasing centrifugal force exerted by weights 18 and 18ª tending to pivotally move lever 15 on the rotation of shaft 2, so that at any point of travel of the lever 15 during acceleration of the speed of shaft 2 the said pull or tension of spring 28 on lever 15 will equal the centrifugal force exerted by said weights to pivotally move said lever 15, thereby maintaining in series with the motor the proper resistance according to motor requirements, I mount said weights 18 and 18ª as shown, and attach or secure the ends of said spring 28 to the ends of said arms 26 and 29, respectively, as shown, whereby, as the lever 15 is pivotally moved by said weights 18 and 18ª upon the rotation of said shaft 2, the stud 23 rides up cam surface 29ª toward bolt 19ª of arm 29, thereby lessening the distance between stud 23 and fulcrum-bolt 19ª and thus varying or changing the leverage of arm 29 relative to stud 23 and increasing the retarding or resisting pull or tension of said spring 28 through arm 29 against stud 23 on lever 15 in proper proportion according to the increasing centrifugal force exerted by said weights tending to pivotally move lever 15 as the speed of the motor increases. For instance, suppose button 34 is in contact with left-hand button 35 and the weights 18 and 18ª are in closed position, the tension of spring 28 being relaxed, circuit breaker 66 being thrown in and current being supplied to the motor, armature shaft 2 begins to revolve, whereupon a certain amount of counter electromotive force is generated by the motor and likewise a certain amount of centrifugal force is developed tending to swing said weights 18 and 18ª outwardly and thereby pivotally move lever 15 and button 34 to the right. Spring 28, however, acting through arm 29 on the stud 23 on lever 15, will prevent the movement of said lever until the centrifugal force developed and exerted by said weights to pivotally move lever 15 on the increasing speed of rotation of said shaft is sufficient to slightly over-balance the pull or tension of said spring 28, on lever 15 whereupon weights 18 and 18ª will swing outwardly and pivotally move lever 15 to the right and cause button 34 to now contact with button 35 immediately to the right of said left-hand button 35, thereby cutting out the preceding unit of resistance 43. This movement of said lever 15, however, causes said stud 23 to now begin to travel up the side of arm 29 or said cam face 29ª, whereby the leverage of arm 29 relative to stud 23 is changed and the tension or pull of spring 28 through arm 29 against said stud 23 is proportionally increased to now balance the said centrifugal force developed and exerted by said weights to pivotally move lever 15 at said increasing speed of the motor, and said spring 28, operating as described, will now maintain or hold said lever 15 and button 34 in said new position, button 34 contacting with said button 35 immediately to the right of said left-hand button 35, until, on the increasing speed of the armature shaft 2, the increasing centrifugal force thereby developed and exerted by said weights to pivotally move lever 15 again slightly over-balances the pull of said spring 28, through arm 29 against stud 23, when lever 15 will again be pivotally moved to the right and contact button 34 will now contact with the next succeeding button 35, stud 23 traveling up cam surface 29ª and thereby varying or changing the leverage of arm 29 relative to said stud 23 and proportionally increasing the pull of spring 28 through arm 29 against stud 23 to hold said lever 15 and button 34 in said last-mentioned position until the centrifugal force further developed on the increasing speed of shaft 2 again slightly over-balances the pull of said spring 28, through arm 29 against stud 23, when lever 15 and button 34 will again be moved to the right, button 34 contacting with the next succeeding button 35 and cutting out the preceding unit of resistance 43, and so on, the speed of the motor and the counter electromotive force generated by the motor increasing as each unit of resistance 43 is in turn cut out, and likewise the tension or pull of said spring 28 through arm 29 against stud 23 being proportionally increased as said lever 15 is caused to pivotally move to the right and stud 23 caused to travel up cam surface 29ª by the outward swinging of said weights 18 and 18ª on the increasing centrifugal force developed on the rotation of said shaft, lever 15 being thus centrifugally moved by said weights in direct proportion to the increasing speed of the motor and resistance units 43 being thus gradually or step-by-step, so to speak, and progressively cut out as said lever 15 moves or travels to its outermost position and as said button 34 contacts in turn with each succeeding button 35 to the right of left-hand button 35.

Now, it will be seen that as said weights 18 and 18ª swing outwardly toward their outermost position, the centers of gravity thereof approach the line of centers of pivot bolts 19, 19ª, and 16, and that, as the centrifugal force is developed outwardly from center point 16 in the direction of the line of these centers, the centrifugal force exerted by said weights to pivotally move the said lever decreases, this centrifugal force being thrown upon and taken up by said pivot bolts 19 and 19ª; in other words, as the centers of gravity of said weights 18 and 18ª approach the line of centers of said bolts 19, 19ª, and 16, the centrifugal force exerted by the weights 18 and 18ª increases in the direction of the line of centers of said pivot bolts 19, 19ª, and 16, and decreases in the line of pull of said lever 15. It will thus be seen that the spring 28, acting, as described, through said arm 29 and stud 23 on lever 15, is not called upon to equalize or balance all the centrifugal force developed on the increasing speed of rotation of shaft 2, an increasing part of this centrifugal force being thrown upon and taken up by said bolts 19 and 19ª as said weights 18 and 18ª swing outwardly, and is only called upon to progressively balance the increasing centrifugal force exerted by said weights as the motor speeds up to pivotally move said lever. In this way, the increasing centrifugal force developed and exerted by said weights 18 and 18ª to pivotally move said lever 15 as the motor speeds up is adapted to be progressively balanced or equalized by the tension or pull of said spring 28, operating as described so that lever 15 and therewith button 34 as the speed of the motor increases will be moved a prescribed equal distance to the right for each prescribed equal increase of speed of rotation of the armature shaft 2, and, as the contact-buttons 35 of resistance units 43 are likewise equally spaced apart, as shown, the units of resistance 43 will thus be gradually or step-by-step and progressively cut out of series with the motor circuit according to motor requirements or according to the constantly increasing electromotive force generated as the motor speeds up.

Now, after the lever 15 has reached the limit of its travel to the right, button 34 contacting with right-hand button 35 and the series of resistance units 43 being cut out, it is desirable that lever 15 shall be maintained in this position with the resistance units cut out until the motor has stopped or there is a serious decrease in speed, and, therefore, when lever 15 has reached full cutting-out position, the tension or pull of spring 28 through its described connections tending to return lever 15 to normal position is lessened, as hereinafter described, and considerably less centrifugal force is then required or necessary to maintain or hold lever 15 in full cutting-out position. Lever 15 will thus be centrifugally maintained in full cutting-out position until the motor stops or the speed thereof has dropped to such a point that the centrifugal force generated at such reduced speed and exerted by said weights on said lever is not sufficient to overcome the returning pull, as it might be called, of spring 28 through its said connections, when said lever 15 will be automatically reversely actuated or returned to normal position. The outer end of arm 26 normally presses against stud 20, the spring 28 lying to the left of pivot bolt 19 or between pivot bolt 16 and pivot bolt 19, as shown in Fig. 1. As weight 18 is swung outwardly to the right by the increasing centrifugal force developed as shaft 2 speeds up, arm 26 is likewise moved to the right, studs 27 and 27a and pivot bolt 19 gradually approaching a line of dead center and said spring being gradually carried directly thereabove; and as said weight 18 continues to be thrown outwardly by the increasing centrifugal force developed as shaft 2 speeds up and as said lever 15 approaches the outermost limit of its travel to the right, studs 27 and 27a and pivot bolt 19 will be thrown out of line of dead center and spring 28 will be carried to the right of pivot bolt 19, thereby pulling the outer end of said arm 26 away from stud 20 and against said buffer 30, in the position shown in Fig. 5, in which position, as will be seen, the spring 28, acting through its described lever and arm connections, is caused to resist its own action, so to speak, and the pull thereof tending to return lever 15 to normal position is lessened. Accordingly, when said lever is in full cutting-out position, considerably less centrifugal force is necessary or required to balance the returning pull of said spring and maintain or hold said lever in full cutting-out position. Thus lever 15 will be centrifugally maintained in full cutting-out position for a proportional loss of speed. When, however, the speed of the motor has dropped to such a point, and it may be here stated that such point of decreased speed may be regulated or predetermined by varying the position of buffer 30, that the centrifugal force generated at such reduced speed and exerted by said weights on said lever is not sufficient to overcome the returning pull of spring 28 on said lever, lever 15 will be automatically reversely actuated or returned to its original position, automatically cutting into series with the motor circuit said series of resistance units 43, and in returning to which original position the spring 28 will be carried to the left back over said pivot bolt 19 and again pull the outer end of said arm 26 against said stud 20.

My rheostat is preferably adapted to begin to cut out the resistance units when the motor has attained about one-sixth of its rated full speed; to then progressively or successively cut out the resistance units as the motor speeds up and generates counter electromotive force, all the resistance units being cut out when the motor has attained about three-fourths of its rated full speed; and to maintain or keep the resistance units fully cut out until the motor stops or the speed thereof has dropped to about one-fourth of its rated full speed. For instance, in the case of a motor designed to run, say, 1200 revolutions per minute; the current being thrown on, the motor speeds up to about 200 revolutions per minute and at this point lever 15 is adapted to be pivotally moved by said weights 18 and 18a swinging outwardly, and as the speed of the motor increases and as said lever 15 is caused to travel to the right, contact button 34 progressively and successively contacts with said buttons 35, thereby cutting out in turn each preceding unit of resistance, until the motor is running 900 revolutions per minute when the lever 15 has reached the outermost limit of its travel and contact button 34 is now contacting with right-hand button 35, the series of resistance units 43 being cut out, the motor gradually reaching its full rated speed of 1200 revolutions. The lever 15 will be maintained in this latter position, by the means described, until either the current has been cut off, or, for any other cause, the speed of the motor has been reduced to about 300 revolutions per minute, when lever 15 will return to its original position, again cutting in said series of resistance units 43, as before described. However, when building or constructing a motor, as it is known just what amount of resistance is required to protect a motor circuit when the motor is running at a certain speed below rated full speed, that is to say, as the manufacturer of a motor knows just what amount of resistance must be in the motor circuit to protect the same when the motor is running at, say one-fourth rated full speed, what amount of resistance must be in the motor circuit to protect same when the motor is running at, say, one-half rated full speed, and so on, and that the resistance inserted in a motor circuit to protect the same when the motor is started must be cut out accordingly, it will be readily seen that by changing or altering the arc or incline of cam face 29a and consequently the equalizing or balancing pull of spring 28 on lever 15, the movement or travel of lever 15 and button 34 may be regulated, so that there may be in series with the motor when running at a certain speed below rated full speed the exact amount of resistance which the motor circuit requires according to the counter electromotive force generated by the motor when running at such stated speed. It will also be obvious that the same size of rheostat can be used with motors of various sizes by merely changing the amount of resistance or number of resistance units, and upon motors of various speeds by simply varying the weight or size of said weights 18 and 18a, the size or shape of said cam surface 29ª, or correspondingly varying the size or strength of spring 28. I might add that for a 10 H. P. motor running 1200 revolutions per minute, I have used weights 18 and 18ª weighing one pound each, the strength of spring 28 being gaged accordingly.

From the foregoing, it will be seen that my rheostat goes hand in hand with the motor, allowing only a certain amount of resistance for the accompanying speed of the motor and according to the counter electromotive force generated thereby, and maintaining in a motor circuit the proper resistance according to motor requirements at all times of motor acceleration. It will be further seen that there is no liability of the resistance units being burned out or the motor otherwise impaired by the resistance units being maintained in the circuit and carrying the current for too long or too short a period of time; and that my rheostat, on current being supplied to the motor circuit, is automatic in its operations.

It is obvious that while I have herein shown my rheostat mounted directly upon the armature shaft of the motor, it might be equally well mounted on a separate rotatable shaft away from the armature, the speed of rotation of the armature, however, regulating, directly or indirectly, the speed of said shaft.

I am aware that heretofore starting rheostats for motor circuits have been provided in which the resistance units are normally disconnected from the motor circuit when the motor is at a stand-still, said resistance units being switched or thrown into series with the motor circuit when current is supplied to the motor and afterward, by magnetically-actuated or by manually-operated switches, cut out as the motor runs up to speed and generates an increasing counter electromotive force. In my rheostat, however, as will be clear, the resistance units are adapted to be in series with the motor circuit when the motor is at a stand-still, whereby it becomes unnecessary to throw the same into series with the motor circuit when current is supplied to the motor, thereby obviating any liability of damage or impairment to the motor circuit should the resistance units, from oversight or otherwise, not be thrown into series with the motor circuit when the motor is started. And while I am further aware that there have also been provided motor starting rheostats having units of resistance normally in series with the motor circuit when the motor is at a stand-still and in which the said resistance units are adapted to be automatically cut out of series with the motor circuit by a centrifugally-actuated lever or switch as the motor speeds up and generates counter electromotive force; yet, so far as I am aware, I am the first to provide a motor starting rheostat in which not only are the resistance units adapted to be in series with the motor circuit when the motor is at a stand-still and adapted to be automatically and progressively cut out of series with the motor circuit by means governed or actuated, directly or indirectly, by centrifugal force as the motor speeds up, but in which also the increasing centrifugal force developed as the motor speeds up and exerted on said cutting-out means to actuate the same is adapted to be progressively balanced, whereby said resistance units are further adapted to be gradually or step-by-step, so to speak, cut out of series with the motor circuit proportionately or according to motor requirements as the speed of the motor increases.

While I have herein shown and described the preferred form and construction of my rheostat, yet it is to be understood that minor changes in the construction, arrangement, and combination of the several parts of my rheostat might be made and substituted for those shown and described without in the least departing from the nature and principle of my invention.

Having thus described my invention, what I claim and desire to secure by Letters Patent, is—

1. In a motor-starting rheostat, a resistance comprising a series of units and a corresponding series of contact members having electrical connection therewith, said contact members being spaced equally apart and said units being adapted to be normally in series with a motor circuit, and centrifugally-operated mechanism including a contact-member and a plurality of resiliently-connected pivoted lever-arms adapted as the motor speeds up to successively electrically engage with said resistance-contacts to cut said resistance units out of series with said circuit in direct proportion to the increasing speed of the motor; substantially as described.

2. In a motor-starting rheostat, a resistance comprising a series of units and a corresponding series of contact members having electrical connection therewith, said contact members being spaced equally apart and said units being adapted to normally be in series with a motor circuit, means including a contact-member adapted to electrically contact with said resistance contacts and to be centrifugally actuated as the motor speeds up to successively electrically engage with said resistance-contacts to cut said resistance units out of series with said circuit, and means including a plurality of resiliently-connected pivoted lever-arms adapted, as the motor speeds up, to coöperate with said cutting-out means to progressively resistingly balance in direct proportion to the increasing speed of the motor, the increasing centrifugal force exerted on said cutting-out means to actuate the same, substantially as described.

3. In a motor-starting rheostat, a resistance comprising a series of units and a corresponding series of contact members having electrical connection therewith, said contact members being spaced equally apart and said units being adapted to normally be in series with a motor circuit, pivotally-movable means including a contact-member adapted to electrically contact with said resistance contacts and to be centrifugally actuated as the motor speeds up to successively electrically engage with said resistance-contacts to cut said resistance units out of series with said circuit, and means including a plurality of resiliently-connected pivoted lever-arms adapted, as the motor speeds up, to coöperate with said cutting-out means to progressively resistingly balance the increasing centrifugal force exerted on said cutting-out means to actuate the same; substantially as described.

4. In a motor-starting rheostat, a resistance comprising a series of units and a corresponding series of contact members having electrical connection therewith, said contact members being spaced equally apart and said units being adapted to be normally in series with a motor circuit, pivotally-movable means including a contact member adapted to be normally in series with the entire series of resistance units and to be centrifugally actuated as the motor speeds up to successively electrically engage with said resistance-contacts to cut said resistance units out of series with said circuit, and means including a plurality of resiliently-connected pivoted lever-arms having engagement with said cutting-out means and adapted normally to hold the same in series with said entire series of resistance units and as the motor speeds up to coöperate with said cutting-out means to progressively resistingly balance the increasing centrifugal force exerted on said cutting-out means to actuate the same; substantially as described.

5. In a motor-starting rheostat, a resistance comprising a series of units and a corresponding series of contact members having electrical connection therewith, said contact members being spaced equally apart and said units being adapted to be normally in series with a motor circuit, a pivotally-movable lever, a contact member on said lever adapted to be normally in series with the entire series of resistance units, a plurality of pivotally-movable weights having connection with said lever, said weights being adapted to be centrifugally actuated as the motor speeds up to pivotally move said lever and its said contact-member, to successively electrically engage with said resistance units to cut said resistance units out of series with said circuit, and means including a plurality of resiliently-connected pivoted lever-arms having engagement with said weights and lever and adapted normally to hold said weights in closed position with said contact member in series with said entire series of resistance units and as the motor speeds up to coöperate with said weights and lever to progressively resistingly balance the increasing centrifugal force exerted by said weights to pivotally move said lever and its said contact-member; substantially as described.

6. In a motor-starting rheostat, a rotatable plate, a resistance on said plate comprising a series of units and a corresponding series of contact members having electrical connection therewith, said contact members being spaced equally apart and said units being adapted to be normally in series with a motor circuit, a lever pivotally mounted on said plate, a contact member on said lever adapted to be normally in series with the entire series of resistance units, a plurality of weights pivotally mounted on said plate and having connection with said lever, said weights being adapted to be centrifugally actuated as the motor speeds up to pivotally move said lever and its said contact member to successively electrically engage with said resistance-contacts to cut said resistance units out of series with said circuit, and means including a plurality of resiliently-connected arms pivoted on said plate having engagement with said weights and lever normally and adapted to hold said weights in closed position with said contact member in series with said entire series of resistance units and as the motor speeds up to coöperate with said weights and lever to progressively resistingly balance the increasing centrifugal force exerted by said weights to pivotally move said lever and its said contact member; substantially as described.

7. A motor-starting rheostat comprising a plate, a series of resistance units on said plate adapted to be in series with a motor circuit when the motor is at a stand-still, a lever pivotally mounted on said plate adapted to be in series with the entire series of resistance units when the motor is at a standstill, weights pivotally mounted on said plate and connected to said lever, said weights being adapted to be centrifugally actuated as the motor speeds up to pivotally move said lever to successively cut said resistance units out of series with said circuit, arms pivotally mounted on said plate, and a coiled spring connecting the free ends of said arms, said spring-connected arms engaging with said weights and lever and adapted normally to hold said weights in closed position with said lever in series with said entire series of resistance units and as the motor speeds up to coöperate with said weights and lever to proportionally increase the pull of said spring against said lever to progressively resistingly balance the increasing centrifugal force exerted by said weights to pivotally move the same; substantially as described.

8. A motor-starting rheostat comprising a plate, a series of resistance units on said plate adapted to be in series with a motor circuit when the motor is at a standstill, a lever pivotally mounted on said plate adapted to be in series with the entire series of resistance units when the motor is at a standstill, weights pivotally mounted on said plate and connected to said lever, said weights being adapted to be centrifugally actuated as the motor speeds up to pivotally move said lever to successively cut said resistance units out of series with said circuit, a stud on one of said weights, a second stud on said lever, arms pivotally mounted on said plate, and a coiled spring connecting the free ends of said arms, said spring-connected arms being adapted to bear against said studs to normally hold said weights in closed position with said lever in series with said entire series of resistance units and said lever-stud being adapted to ride up its engaging arm as the motor speeds up and said lever and weights pivotally moved to proportionally increase the pull of said spring against said lever to progressively balance the increasing centrifugal force exerted by said weights to pivotally move the same; substantially as described.

9. In a motor-starting rheostat, a rotatable plate, a resistance comprising a series of units arranged on said plate and adapted to be normally in series with a motor circuit, a double lever pivoted between its ends on said plate, a contact member on said lever adapted to be normally in series with the entire series of resistance units, a plurality of oppositely-disposed weights pivotally mounted on said plate and having connection with said lever, and means on said plate resiliently engaging with said lever to normally hold said contact-member in series with said entire series of resistance units, said weights being adapted to be centrifugally actuated as the motor speeds up to pivotally move said lever and its said contact-member against the pull of said resilient means to progressively cut said resistance units out of series with said circuit; substantially as described.

10. In a motor-starting rheostat, a rotatable plate, a resistance comprising a series of units on said plate and adapted to be normally in series with a motor circuit, a double lever pivoted between its ends on said plate, a contact member on said lever adapted to be normally in series with the entire series of resistance units, a plurality of oppositely-disposed weights pivotally mounted on said plate, links pivotally connected to said lever and to said weights, and means including a spring-pulled arm engaging with said weights and lever to normally hold said contact-member in series with said entire series of resistance units, said weights being adapted to be centrifugally actuated as the motor speeds up to pivotally move said lever and its said contact-member against the pull of said arm to progressively cut said resistance units out of series with said circuit; substantially as described.

11. In a motor-starting rheostat, the combination with a rotatable plate, of a resistance on said plate comprising a series of units and a corresponding series of contact members having electrical connection therewith, said contact members being spaced equally apart and said units being adapted to be normally in series with a motor circuit, and centrifugally operated mechanism on said plate adapted, on the rotation of said plate as the motor speeds up, to gradually cut said resistance units out of series with said circuit in direct proportion to the increasing speed of the motor, said means including a contact-member and a plurality of resiliently connected pivoted lever-arms, substantially as described.

12. In a motor-starting rheostat, a rotatable plate, a resistance comprising a series of units on said plate and adapted to be normally in series with a motor circuit, a double lever pivoted between its ends on said plate, a contact member on said lever adapted to be normally in series with the entire series of resistance units, and a pair of weights pivotally mounted on said plate on opposite sides of, and having pivotal connection with, said lever, said weights being adapted to be centrifugally thrown outwardly, on the rotation of said plate as the motor speeds up, to pivotally move said lever and its said contact-member to progressively cut said resistance units out of series with said circuit; substantially as described.

13. In a motor-starting rheostat, a rotatable plate, a resistance comprising a series of units on said plate and adapted to be normally in series with a motor circuit, a double arm lever pivoted between its ends on said plate, a contact member on said lever adapted to be normally in series with the entire series of resistance units, a pair of oppositely-disposed weights pivotally mounted on said plate on opposite sides of, and having pivotal connection with, said lever, and means including a spring-pulled pivoted arm normally engaging with said lever to hold said contact-member in series with said entire series of resistance units, said weights being adapted to be centrifugally thrown outwardly, on the rotation of said plate as the motor speeds up, to pivotally move said lever and its said contact-member against the pull of said arm to progressively cut said resistance units out of series with said circuits; substantially as described.

14. In a motor-starting rheostat, a rotatable plate, a resistance comprising a series of units on said plate and adapted to be normally in series with a motor circuit, a double lever pivoted between its ends on said plate, a contact member on said lever adapted to be normally in series with the entire series of resistance units, a pair of oppositely-disposed weights pivotally mounted on said plate on opposite sides of, and having pivotal connection with, said lever, and a pair of spring-connected arms pivotally mounted on said plate and engaging with said weights and lever to normally hold said contact-member in series with said entire series of resistance units, said weights being adapted to be centrifugally thrown outwardly, on the rotation of said plate as the motor speeds up, to pivotally move said lever and its said contact-member against the pull of said arms to progressively cut said resistance units out of series with said circuit; substantially as described.

15. A motor-starting rheostat comprising a rotatable plate, a series of resistance units on said plate adapted to be in series with a motor circuit when the motor is at a standstill, a lever pivotally mounted on said plate adapted to be in series with the entire series of resistance units when the motor is at a standstill, weights pivotally mounted on said plate and connected to said lever, said weights being adapted to be centrifugally thrown outwardly, on the rotation of said plate as the motor speeds up, to pivotally move said lever to successively cut resistance units out of series with said circuit, arms pivotally mounted on said plate, and a coiled spring connecting the free ends of said arms, said spring-connected arms being adapted to coöperate with said weights and lever as the motor speeds up to progressively resistingly balance the increasing centrifugal force exerted by said weights to pivotally move said lever; substantially as described.

16. A motor-starting rheostat comprising a rotatable plate, a series of resistance units on said plate adapted to be in series with a motor circuit when the motor is at a standstill, a lever pivotally mounted on said plate adapted to be in series with the entire series of resistance units when the motor is at a standstill, weights pivotally mounted on said plate, links pivotally connected to said lever and to said weights, said weights being adapted to be centrifugally thrown outwardly on the rotation of said plate as the motor speeds up to pivotally move said lever to cut said resistance units out of series with said circuit, arms pivotally mounted on said plate, and a coiled spring connecting the free ends of said arms, said spring-connected arms engaging with said weights and lever and being adapted normally to hold said weights in closed position with said lever in series with said entire series of resistance units and as the motor speeds up, to coöperate with said weights and lever to progressively resistingly balance the increasing centrifugal force exerted by said weights to pivotally move said lever; substantially as described.

17. A motor-starting rheostat comprising a rotatable plate, a series of resistance units on said plate adapted to be in series with a motor circuit when the motor is at a standstill, a lever pivotally mounted on said plate adapted to be in series with the entire series of resistance units when the motor is at a standstill, weights pivotally mounted on said plate and connected to said lever, said weights being adapted to be centrifugally thrown outwardly on the rotation of said plate as the motor speeds up to pivotally move said lever to successively cut said resistance units out of series with said circuit, a stud on one of said weights, a second stud on said lever, arms pivotally mounted on said plate, and a coiled spring connecting the free ends of said arms and extending between the pivots of said weights, said spring-connected arms being adapted to bear against said studs to normally hold said weights in closed position with said lever in series with said entire series of resistance units and said lever-stud being adapted to ride up its engaging arm as the motor speeds up and said lever and weights pivotally moved to proportionally increase the pull of said spring against said lever to progressively balance the increasing centrifugal force exerted by said weights to pivotally move said lever; substantially as described.

18. A motor-starting rheostat comprising a series of resistance units adapted to be normally in series with a motor circuit, a pivotally movable lever adapted to be normally in series with the entire series of resistance units, pivotally-movable weights connected to said lever and adapted to be centrifugally actuated as the motor runs up to approximately full speed to pivotally move said lever to successively cut said units of resistance out of series with said circuit, and pivotally-mounted spring-connected arms coöperating with said weights and lever and adapted after said lever has been pivotally moved to full cutting-out position to automatically reversely actuate said lever to successively cut said resistance units into series with said circuit on a predetermined decrease in the speed of the motor, said lever being centrifugally maintained by said weights in full cutting-out position until so reversely actuated; substantially as described.

19. A motor-starting rheostat comprising a plate, a series of resistance units on said plate adapted to be normally in series with a motor circuit, a lever pivotally mounted on said plate adapted to be normally in series with the entire series of resistance units, weights pivotally mounted on said plate and connected to said lever, said weights being adapted to be centrifugally actuated as the motor runs up to approximately full speed to pivotally move said lever to successively cut said resistance units out of series with said circuit, and spring-connected arms pivotally mounted on said plate and coöperating with said weights and lever, and adapted after said lever has been pivotally moved to full cutting-out position to automatically reversely actuate said lever to successively cut said resistance units into series with said circuit on a predetermined decrease in the speed of the motor, said lever being centrifugally maintained by said weights in full cutting-out position until so reversely actuated; substantially as described.

20. A motor-starting rheostat comprising a rotatable plate, a series of resistance units on said plate adapted to be normally in series with a motor circuit, a lever pivotally mounted on said plate adapted to be normally in series with the entire series of resistance units, weights pivotally mounted on said plate and connected to said lever, said weights being adapted to be centrifugally actuated on the rotation of said plate as the motor runs up to approximately full speed to pivotally move said lever to successively cut said resistance units out of series with said circuit, and spring-connected arms pivotally mounted on said plate and coöperating with said weights and lever and adapted after said lever has been pivotally moved to full cutting-out position to automatically reversely actuate said lever to successively cut said resistance units into series with said circuit on a predetermined decrease in the speed of the motor, said lever being centrifugally maintained by said weights in full cutting-out position until so reversely actuated; substantially as decribed.

21. In a motor-starting rheostat, a rotatable plate, a resistance comprising a series of units on said plate and adapted to be normally in series with a motor circuit, a lever pivotally mounted on said plate, a contact-member on said lever adapted to be normally in series with the entire series of resistance units, a pair of weights pivotally mounted on said plate on opposite sides of, and having pivotal connection with, said lever and adapted to be centrifugally actuated on the rotation of said plate as the motor runs up to approximately full speed to pivotally move said lever and its said contact-member to successively cut said units of resistance out of series with the motor circuit, and means including a pair of resiliently-connected pivoted lever-arms having engagement with said weights and lever and adapted to normally hold said weights and lever in closed position with said contact-member in series with said entire series of resistance units, to coöperate with said weights and lever as the motor runs up to approximately full speed to progressively resistingly balance the increasing centrifugal force exerted by said weights to pivotally move said lever and its said contact-member, and to further coöperate with said weights and lever after said lever has been so pivotally moved to full cutting-out position to automatically reversely actuate said lever and its said contact-member to successively cut said resistance units into series with said circuit on a predetermined decrease in the speed of the motor, said lever and its said contact-member being centrifugally held by said weights in full cutting-out position until so reversely actuated; substantially as described.

22. A motor-starting rheostat comprising a rotatable plate, a series of resistance units on said plate adapted to be normally in series with a motor circuit, a lever pivotally mounted on said plate adapted to be normally in series with the entire series of resistance units, weights pivotally mounted on said plate and connected to said lever, said weights being adapted to be centrifugally actuated on the rotation of said plate as the motor runs up to approximately full speed to pivotally move said lever to successively cut said resistance units out of series with said circuit, and spring-connected arms pivotally mounted on said plate and engaging with said weights and lever and adapted to normally hold said weights in closed position with said lever in series with said entire series of resistance units, to coöperate with said weights and lever as the motor runs up to approximately full speed to progressively resistingly balance the increasing centrifugal force exerted by said weights to pivotally move said lever, and to further coöperate with said weights and lever after said lever has been so pivotally moved to full cutting-out position to automatically reversely actuate said lever to successively cut said resistance units into series with said circuit on a predetermined decrease in the speed of the motor, said lever being centrifugally maintained by said weights in full cutting-out position until so reversely actuated; substantially as described.

23. In a motor-starting rheostat, a rotatable plate, a resistance comprising a series of units mounted on said plate, a concentric series of contact buttons on said plate and in electrical contact with said series of resistance units, a metallic contact strip on said plate, said entire series of resistance units and said contact plate being adapted to be normally inseries with a motor circuit, a double lever pivoted between its ends on said plate, a contact-member on said lever in electrical contact with said strip and normally in series with the entire series of resistance units, and a pair of oppositely-disposed weights pivotally mounted on said plate on opposite sides of, and having pivotal connection with, said lever, said weights being adapted to be centrifugally thrown outwardly on the rotation of said plate as the motor speeds up to pivotally move said lever and its said contact member to contact successively with said contact buttons and progressively cut said resistance units out of series with the motor circuit; substantially as described.

24. A motor-starting rheostat comprising a rotatable plate, a series of resistance units mounted on said plate, a concentric series of contact buttons on said plate and in electrical contact with said series of resistance units, a metallic contact strip on said plate, said entire series of resistance units and said contact plate being adapted to be in series with a motor circuit when the motor is at a standstill, a lever pivotally mounted on said plate in electrical contact with said strip and adapted to be in series with said entire series of resistance units when the motor is at a standstill, weights pivotally mounted on said plate on opposite sides of, and connected to, said lever, and spring-connected arms pivotally mounted on said plate and engaging with said weights and lever to normally hold said weights in closed position with said lever in series with said entire series of resistance units, said weights being adapted to be centrifugally thrown outwardly on the rotation of said plate as the motor speeds up to pivotally move said lever against the pull of said arms to contact successively with said contact buttons and cut said resistance units out of series with the motor circuit; substantially as described.

25. A motor-starting rheostat comprising a rotatable plate, a series of resistance units mounted on said plate, a concentric series of contact buttons on said plate and in electrical contact with said series of resistance units, a metallic contact strip on said plate, said entire series of resistance units and said contact plate being adapted to be in series with a motor circuit when the motor is at a standstill, a lever pivotally mounted on said plate in electrical contact with said strip and adapted to be in series with said entire series of resistance units when the motor is at a standstill, weights pivotally mounted on said plate, links pivotally connected to said lever and to said weights, said weights being adapted to be centrifugally thrown outwardly on the rotation of said plate as the motor speeds up to pivotally move said lever to contact successively with said contact buttons and cut said resistance units out of series with the motor circuit, and spring-connected arms pivotally mounted on said plate and engaging with said weights and lever and adapted to normally hold said weights in closed position with said lever in series with said entire series of resistance units and to coöperate with said weights and lever as the motor speeds up to progressively resistingly balance the increasing centrifugal force exerted by said weights to pivotally move said lever; substantially as described.

26. In a motor-starting rheostat, the combination with a rotatable plate, of an annular insulation drum on said plate, a series of continuously wound resistance units in said drum, said series of resistance units being adapted to be normally in series with a motor circuit, a double lever pivoted between its ends on said plate, a contact-member on said lever normally in series with said entire series of resistance units, and a plurality of weights pivotally mounted on said plate on opposite sides of, and having pivotal connection with said lever, said weights being adapted to be centrifugally actuated, as the motor speeds up, to pivotally move said lever and its said contact-member to successively cut said resistance units out of series with said circuit; substantially as described.

27. In a motor-starting rheostat, the combination with a rotatable plate, of an insulation drum mounted on said plate, a series of resistance units arranged in said drum, said series of resistance units being adapted to be in series with a motor circuit when the motor is at a stand-still, a lever pivotally mounted on said plate and adapted to be in series with said entire series of resistance units when the motor is at a stand-still, weights pivotally mounted on said plate and connected to said lever, said weights being adapted to be centrifugally thrown outwardly on the rotation of said plate as the motor speeds up to pivotally move said lever to cut said resistance units out of series with the motor circuit, and spring-connected arms pivotally arranged on said plate and engaging with said weights and lever and adapted to normally hold said lever in series with said entire series of resistance units and to coöperate with said weights and lever as the motor speeds up to progressively resistingly balance the increasing centrifugal force exerted by said weights to pivotally move said lever; substantially as described.

28. In a motor-starting rheostat, the combination with an armature shaft, of a plate fixed thereon and adapted to rotate therewith, metallic rings mounted on and insulated from said armature shaft, brushes adapted to contact with said metallic rings, said brushes being adapted to be in series with a motor circuit, a series of resistance units mounted on said plate and electrically connected with one of said brushes, a concentric series of contact buttons on said plate and in electrical contact with said series of resistance units, a metallic strip on said plate and electrically connected with the other of said brushes, a lever pivotally mounted on said plate in electrical contact with said metallic strip and adapted to be in series with said entire series of resistance units when said armature shaft is at a stand-still, weights pivotally mounted on said plate and connected to said lever, said weights being adapted to be centrifugally thrown outwardly on the rotation of said shaft to pivotally move said lever to successively cut said resistance units out of series with said circuit, and spring-connected arms pivotally arranged on said plate and engaging with said weights and lever and adapted to normally hold said weights in closed position with said lever in series with said entire series of resistance units and to coöperate with said weights and lever as said armature shaft speeds up to progressively resistingly balance the increasing centrifugal force exerted by said weights to pivotally move said lever; substantially as described.

In testimony whereof, I have signed my name to this specification in the presence of two subscribing witnesses.

GEORGE McD. JOHNS.

Witnesses:
LOUIS H. BRUNSWICK,
SHEPARD R. EVANS.